(12) United States Patent
Honoré et al.

(10) Patent No.: US 10,560,569 B2
(45) Date of Patent: Feb. 11, 2020

(54) USER INTERFACE CONTROLS FOR CAPTURING COMMUNICATION DATA

(71) Applicants: Alcide LeRoy Honoré, Atlanta, GA (US); Armond Philip Honoré, Alpharetta, GA (US)

(72) Inventors: Alcide LeRoy Honoré, Atlanta, GA (US); Armond Philip Honoré, Alpharetta, GA (US)

(73) Assignee: BILLSEYE, LLC, Atlanta, GA (US)

(*) Notice: Subject to any disclaimer, the term of this patent is extended or adjusted under 35 U.S.C. 154(b) by 0 days.

(21) Appl. No.: 15/949,329

(22) Filed: Apr. 10, 2018

(65) Prior Publication Data

US 2019/0312969 A1 Oct. 10, 2019

(51) Int. Cl.
*H04M 3/42* (2006.01)
*H04M 3/22* (2006.01)
*H04M 15/00* (2006.01)
*H04W 76/10* (2018.01)

(52) U.S. Cl.
CPC ....... *H04M 3/2281* (2013.01); *H04M 3/2218* (2013.01); *H04M 3/42* (2013.01); *H04M 15/59* (2013.01); *H04M 2201/42* (2013.01); *H04W 76/10* (2018.02)

(58) Field of Classification Search
CPC ............. H04M 3/2218; H04M 3/5175; H04M 3/42221; H04M 2203/551; H04M 1/656; H04M 3/22; H04L 65/1076; H04W 4/16; H04W 24/04; H04W 40/20; H04W 4/14
See application file for complete search history.

(56) References Cited

U.S. PATENT DOCUMENTS

| 2014/0342695 A1* | 11/2014 | Gross | G06F 19/322 455/406 |
| 2015/0154524 A1* | 6/2015 | Borodow | H04W 4/029 705/7.23 |
| 2016/0173693 A1* | 6/2016 | Spievak | G06Q 30/0202 379/265.09 |

\* cited by examiner

*Primary Examiner* — Khalid W Shaheed
(74) *Attorney, Agent, or Firm* — Thomas Horstemeyer, LLP (57) ABSTRACT

Disclosed are various embodiments related to user interface controls for capturing communications data with a remote device. In one embodiment, a system includes a transceiver, a computing device, and an application executable in the computing device. The application can detect an incoming call signal of a phone call and render an incoming call user interface on a display. The incoming call user interface includes a call tracking component that is configured to initiate a call tracking action. The application also can initiate the phone call in response to receiving a user manipulation of the call tracking user interface component. Then, the application can execute the call tracking action, which can involve generating call data associated with the phone call. The application also cause the computing device to render a call tracking user interface that displays the call data.

18 Claims, 10 Drawing Sheets

| | A | B | C | D | E | F | G | H |
|---|---|---|---|---|---|---|---|---|
| 1 | Contact Name | ######## | INCOMIN | Sun, 31 De | 8 sec | Non billab | $0.00 | |
| 2 | Contact Name | ######## | INCOMIN | Sun, 31 De | 19 sec | Non billab | $0.00 | |
| 3 | Contact Name | ######## | INCOMIN | Sun, 31 De | 11 sec | Billable ca | $1.07 | |
| 4 | Contact Name | ######## | MISSED | Sun, 31 De | 0 sec | Non billab | $0.00 | |
| 5 | Contact Name | ######## | OUTGOIN | Fri, 29 Dec | 29 sec | Non billab | $0.00 | |
| 6 | Contact Name | ######## | MISSED | Fri, 29 Dec | 0 sec | Non billab | $0.00 | |
| 7 | Contact Name | ######## | OUTGOIN | Thu, 28 De | 3 sec | Billable ca | $2.33 | |
| 8 | Contact Name | ######## | INCOMIN | Thu, 28 De | 24 sec | Billable ca | $1.46 | |
| 9 | Contact Name | ######## | INCOMIN | Thu, 28 De | 15 sec | Non billab | $0.00 | |
| 10 | Contact Name | ######## | OUTGOIN | Wed, 27 D | 9 sec | Billable ca | $0.97 | |
| 11 | Contact Name | ######## | INCOMIN | Wed, 27 D | 10 sec | Billable ca | $0.00 | |
| 12 | Contact Name | ######## | INCOMIN | Wed, 27 D | 7 sec | Non billab | $0.00 | |
| 13 | Contact Name | ######## | INCOMIN | Wed, 18 O | 14 sec | Non billab | $0.00 | |
| 14 | Contact Name | ######## | INCOMIN | Wed, 18 O | 17 sec | Non billab | $0.00 | |
| 15 | Contact Name | ######## | INCOMIN | Wed, 18 O | 17 sec | Non billab | $0.00 | |

USER INTERFACE CONTROLS FOR CAPTURING COMMUNICATION DATA

BACKGROUND

Widespread availability of mobile devices has enabled service professionals to work fluidly inside and outside of the office environment. Oftentimes, service professionals are compensated based on the amount of time spent working on behalf of a client. Mobile devices have enabled service professionals to make more efficient use of their time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAIL DESCRIPTION

Mobile devices, such as smartphones, have enabled service professionals to fluidly communicate inside and outside of the office with their clients. Oftentimes, service professionals are compensated based on the amount of time they spend on behalf of a client. With this in mind, service professionals can desire to track the amount of time spent working on projects for various clients. This desire can be challenging when service professionals are using their mobile devices to work for various clients while at different locations. For example, service professionals may desire to track the length of time spent on particular phone calls on behalf of a client.

The embodiments of the present disclosure relate to improved user interfaces that can be rendered to capture various communications metrics being conducted on a mobile device. In some cases, the improved user interfaces can be rendered before, during, or after phone calls to control which communications metrics and data are captured. For example, the embodiments can enable a user to track metrics for text messages and phone calls conducted for a particular client account, record phone calls, generate transcripts of the phone calls, add text or voice annotations with respect to particular phone calls, and facilitate an automation of billing invoices generated based on the text message and phone call metrics. These features can be controlled by way of various user interfaces that are displayed on a mobile device before, during, and after phone calls.

Additionally, the embodiments improve the efficiency of capturing communications metrics and communications data on mobile devices. Particularly, the embodiments do not require invoking a separate dedicated mobile application because the embodiments are related to improved user interfaces integrated with existing phone call functionality. Thus, these improved user interfaces save a user from having to go to separate dedicated applications before, during, or after phone calls. For example, these embodiments can enable a user to track phone call metrics without having to navigate through multiple user interfaces. Thus, these embodiments are directed to an improvement in the functioning of mobile devices, particularly those with small screens. Further, in some implementations, the embodiments modify existing phone user interfaces used in mobile devices in order to enable a user additional functionality for tracking phone call metrics data and capturing audio recordings and notes during the phone call. References will now be made in detail to the description of the embodiments as illustrated in the drawings.

Figure 1:
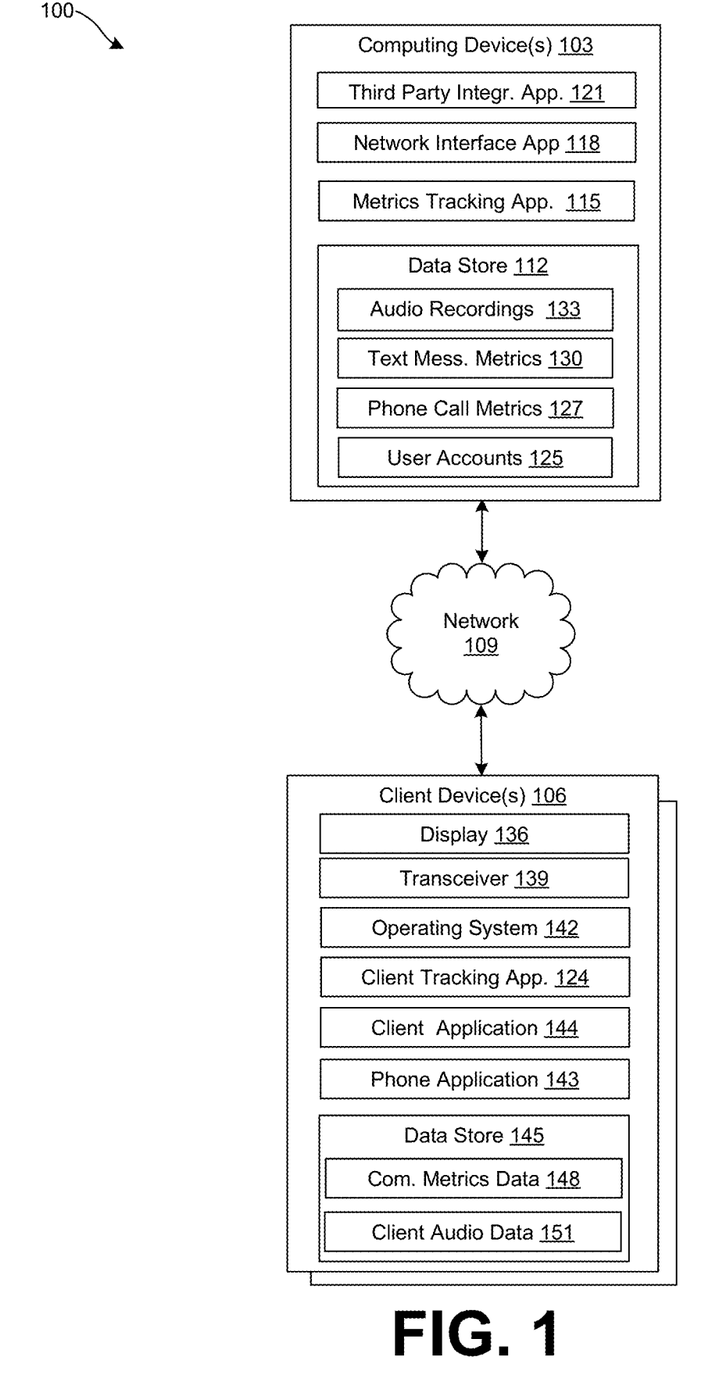
FIG. 1 is a drawing of a networked environment, according to various embodiments of the present disclosure.

With reference to FIG. 1, shown is a networked environment 100 according to various embodiments. The networked environment 100 includes a computing device 103 and a client device(s) 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing device 103 may comprise, for example, a server computer or any other system providing computing capability. Alternatively, the computing device 103 may employ a plurality of computing devices that may be arranged, for example, in one or more server banks or computer banks or other arrangements. Such computing devices may be located in a single installation or may be distributed among many different geographical locations. For example, the computing device 103 may include a plurality of computing devices that together may comprise a hosted computing resource, a grid computing resource and/or any other distributed computing arrangement. In some cases, the computing device 103 may correspond to an elastic computing resource where the allotted capacity of processing, network, storage, or other computing-related resources may vary over time.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a metrics tracking application 115, a network interface application 118, a third party integration application 121, and other applications, services, processes, systems, engines, or functionality not discussed in detail herein. The metrics tracking application 115 is executed to store and share metrics related to phone calls, text messages, and other suitable forms of communications that are conducted the client device 106.

The network interface application 118 is executed to provide a network page interface over the network 109 to various devices. The network page interface can render a user interface that enables a user to operate various features similar to a client tracking application 124 executed on the client device 106. For example, the network page interface can enable a user to view and/or extract the phone call metrics 127, text messages metrics 130, audio recordings, and other suitable data stored in the computing device 103 for the client device 106.

The third party integration application 121 is executed to integrate the phone call metrics, text messaging metrics, or other suitable data generated by the client device 106 with third party programs. For example, the phone call metrics 127 and text messaging metrics 130 can be transmitted in a file format that is usable by a third-party billing application to automatically generate billing invoices based on the metrics data. As another example, the audio recordings of phone conversations, audio recordings of voice memos, notes associated with the various recordings and phone calls, or other suitable data can be transmitted to a third party document management program to be stored. Particularly, a service professional may use a document management program to store and access various files, such as documents, audio recordings, or videos, for a particular client. The third party integration application 121 can facilitate the transfer of the data generated on the client device 106 to an appropriate client account for the user of the client device 106.

The data stored in the data store 112 includes, for example, user accounts data 125, phone call metrics 127, text messaging metrics 130, audio recordings 133, and potentially other data. The user account 125 can represent user profile information, such as name, password, device information (e.g. client device 106), a billing rate of the user, and other suitable data related to a user.

The phone call metrics 127 can include data generated with respect to the phone calls conducted on the client device 106. Some non-limiting examples of the phone call metrics 127 can include characteristics related to individual phone calls, such as a call duration, a call date, a contact name, a phone number, a classification of the phone call, a billing fee, or other suitable phone call data. For example, the phone metrics data 127 may include a call log of phone calls conducted over a period of time. For example, an accountant can classify each phone call as billable or non-billable.

The text messaging metrics 130 can include data generated to track the text messages sent and received on the client device 106. As non-limiting examples, the characters for the text messages can be counted, and the character count can be used for generating billing invoices according to fee-per-character rate. The text messages can be associated with a particular client account of a user account. Additionally, the text messages metrics data 130 can be stored in a third party document management program. For instance, a user, such as a service professional, can have a text messages conversation with a client. The client device 106 can transmit the text message conversation to a third party document management program for storage, and the character count for the text message conversation can be used for generating a billing invoice that can be sent to the client.

The audio recordings 133 can include data related to voice memos captured by the client device, audio recordings of telephone conversations, corresponding transcripts of the audio recordings, and other suitable data related to the audio recordings captured by the client device 106. In some embodiments, upon receiving user input from one of the user interfaces, the client tracking application 124 can generate a transcript of the audio recordings of telephone conversations, the voice memos, and other audio recordings stored on the client device 106. The transcripts can be rendered for display on the client device 106. The transcripts can also be transmitted to the computing device 103 for storage in the data store 112.

The client device 106 is representative of a plurality of client devices that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may also include a display 136. The display 136 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 106 may also comprise a transceiver 139 that is used for voice and data communications with each other devices. The transceiver 139 can be used to manage voice communication sessions and data communication sessions contemptuously.

The client device 106 may be configured to execute various applications such as an operating system 142, a client tracking application 124, a client application 144, and/or other applications. The operating system 142 can be executed to manage the operations of other applications executed on the client device 106.

The client application 144 may be executed in the client device 106, for example, to access network content served up by the computing device 103 and/or other servers, thereby rendering a user interface on the display 136. To this end, the client application 144 may comprise, for example, a browser, a dedicated application, a network page, an application screen, etc. The client device 106 may be configured to execute other applications, for example, email applications, social networking applications, word processors, spreadsheets, and/or other applications.

The client tracking application 124 can be executed to render user interfaces for controlling the various aspects for capturing communication metrics, such as tracking call duration, recording telephone call audio, tracking text message character counts, recording audio for voice memos, or other suitable communications data conducted on the client device 106. The client tracking application 124 can also communicate data from the data store 145 to the metric tracking application 115 for storage in the computing device 103.

The data stored in the data store 145 of the client device 106 may include, for example, communications metrics data 148, client audio data 151, and potentially other data. The communications metrics data 148 can include data generated with respect to the phone calls and text messages conducted on the client device 106. Some non-limiting examples of the generated data can include characteristics related to individual phone calls, such as a call duration, a call date, a contact name, a phone number, a billing classification, a billing fee, or other suitable phone call data. The client audio data 151 can refer to audio recordings of phone calls conducted on the client device 106, audio for voice memos captured on the client device 106, and other suitable data.

Next, a general description of the operation of the various components of the networked environment 100 is provided. To begin, the client device 106, for example a smartphone, may be used by a service professional, such as an accountant, a consultant, a lawyer, a doctor, or other suitable service professionals that desire to track various forms of communication used working while working on behalf of their clients.

As non-limiting example, the embodiments can be used to track time spent on phone calls occurring on the client device 106 and on behalf of a client of the service professional. The tracked time can be used to facilitate the automatic generation of a billing invoice and transmission of the billing invoice to the client. In an incoming call scenario, a client may call a service professional, such as a lawyer, on their client device 106. With the client tracking application 144 executing in the background, the transceiver 139 detects an incoming call signal of the telephone call from the client's remote device. In response to detecting the incoming call, the client tracking application 124 can render an incoming call user interface, e.g. FIG. 2B, on the client device 106. In some embodiments, the incoming call user interface can be rendered instead of the native incoming user interface generated by the native phone application 143. In other embodiments, the client tracking application 124 can add user interface components to the native incoming user interface, where the added components can be used to initiate the tracking of phone call metrics.

The incoming call user interface can comprise a call tracking component that is configured to answer the telephone call and initiate the execution of a call tracking action during the telephone call. The incoming call user interface can also include an accept call component that answers that the telephone call and does not execute a tracking of metrics for the phone call.

Additionally, the incoming call user interface includes a decline call component that is configured to decline the incoming call. In this scenario, the user can manipulate the call tracking user interface component to answer the telephone call and initiate the call tracking action. Upon manipulating, e.g. "clicking", the call tracking component, the client tracking application 124 can render a call tracking user interface, e.g. FIG. 2C, on the client device 106 during the call. The call tracking user interface can display call metrics data that is generated with respect to the telephone call.

Some non-limiting examples of the phone call metrics data 127 that can be displayed on the call tracking user interface include a real-time billing amount, a call duration, a contact identifier, a user-specified classification of the phone call (e.g. billable, non-billable, project name, etc.), and other suitable data. In some embodiments, the user-specified classification can also include a status of an account associated with the contact name or phone number. For example, the client device 106 can retrieve and display billing data related to an invoice balance owed, whether the contact is associated with a delinquent account, and other suitable billing related information.

In addition, on the client call tracking user interface, the user can manipulate user interface elements to initiate features such as recording the conversation, generating a notes user interface for inserting notes contemporaneously to the phone call taking place, or other suitable functionality. The phone call metrics data 127 and other data can be stored in association with a contact identifier, a phone number, or some other suitable identifier for other users participating on the phone call.

In another scenario, a user can desire to initiate a phone call that he/she desires to track. In some embodiments, the user can navigate to the contact name of the person they desire to call from a home user interface of the client tracking application 124, e.g. FIG. 2A. From the home user interface, the user can select a "Contacts" component, and then the user can navigate to the particular contact person that they desire to initiate a phone call. Upon receiving user input to initiate a phone call with the particular contact person, the client tracking application 124 a render a call tracking user interface and establish the phone call with the selected contact person upon acceptance of the phone call by the remote device of the selected contact.

Alternatively, the user can initiate a phone call while tracking the phone call metrics through the native phone application 143 of the client device 106. In this example, the native phone application 143 can render a contacts user interface that includes a phone number, a name, or other suitable contact information associated with a phone number. The contacts user interface can be modified to include a "client call" user interface component. Upon selecting the "client call" component, the client tracking application 124 can be invoked to initiate the phone call with the contact person and begin tracking the metrics for the phone call. In this scenario, after receiving the selection of the "client call" component, the call tracking user interface can be rendered on the client device 106.

Figure 2A:
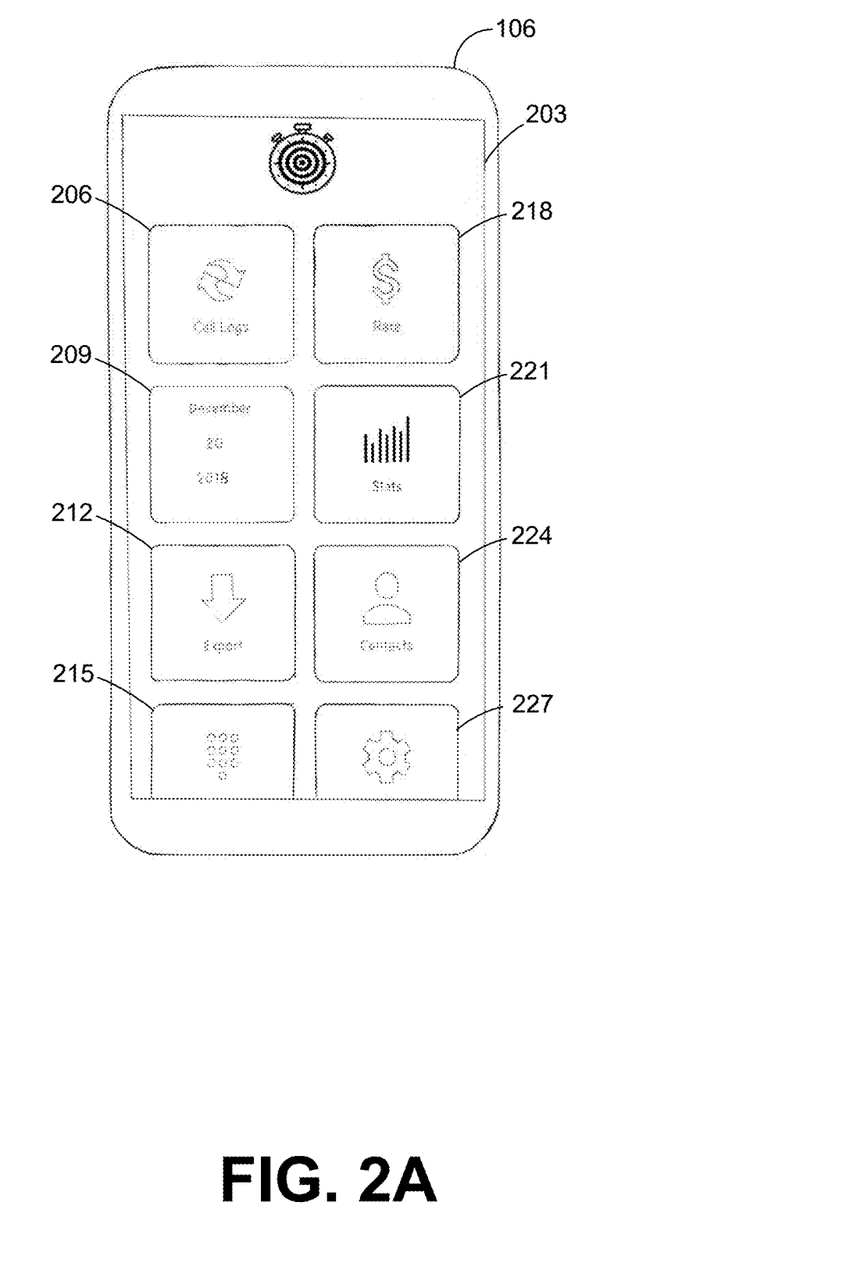
FIGS. 2A through 2J illustrate various user interfaces for a client tracking application being rendered on a client device, according to various embodiments of the present disclosure.
Figure 2B:
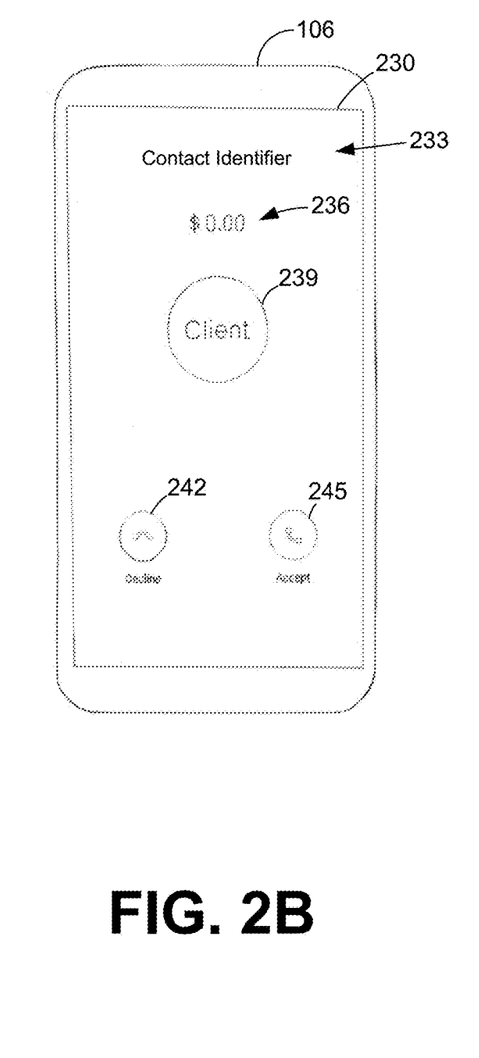
Figure 2C:
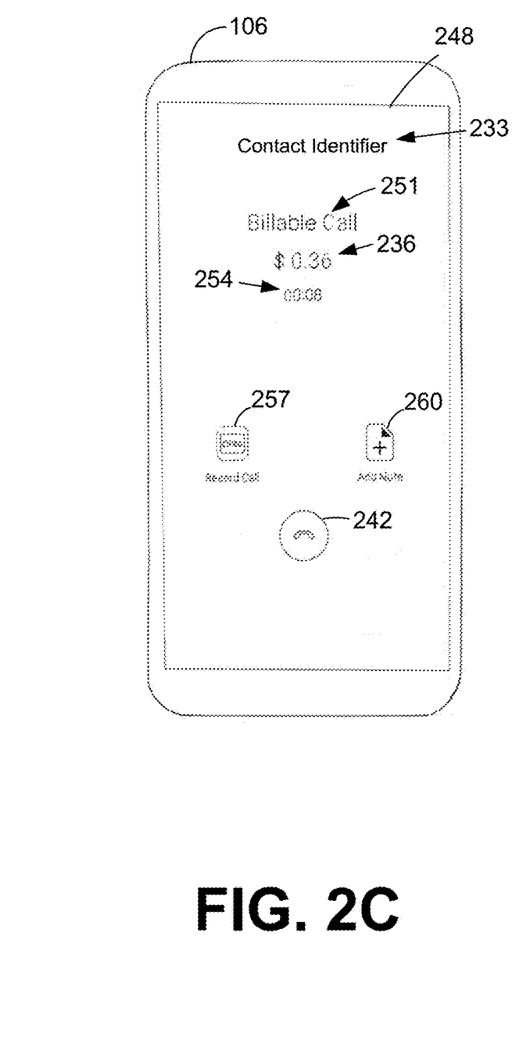

Turning to FIG. 2A, shown is a view of a home user interface 203 for the client tracking application 124. As illustrated in FIG. 2A, the home user interface 203 includes user interface components for Call Logs 206, Calendar 209, Export 212, Keypad 215, Rate 218, Stats 221, Contacts 224, and Settings 227.

The Call Logs 206 can be selected by the user to render a call log user interface that display a list of client-tracked calls. The call log user interface can include a list of recent phone calls initiated and/or received on the client device 106. The call log user interface can include the user-specified classification (e.g. billable, non-billable), a call duration, a date of call, a billing fee, or other suitable call log data. The Calendar 209 can be selected by the user to render a calendar user interface. The calendar user interface can be used to track scheduled meetings such as in-person meetings, conference calls, and other suitable meetings. The Export 212 can be selected by the user to render a display for exporting, accessing, viewing, or playing the communications metrics data 148 and the client audio data 151 that has been stored on the client device 106. For example, the phone call metrics data can be exported in a comma-separated values (CSV) file format or an Excel™ file format to a third party application. In one example, the phone call metrics data can be exported to a third-party billing application in a CSV format. The third-party billing application may require data to be received in a CSV format. The third-party billing application can extract the phone call metrics 127 data and automatically generate a billing invoice for the user of the client device 106.

The Keypad 215 can be selected by the user to render a display of a phone dialer for entering a phone number for dialing. The Rate 218 can be selected for entering a billing rate of a user. The Stats icon 221 can be selected by the user to render a display of the communications metrics data 148. In some examples, the communications metrics data 148 can be displayed in a particular file format, such as Microsoft Excel™, Microsoft Word™, a comma-separated values (CSV) file format, Microsoft PowerPoint™, and other suitable file formats.

The Contacts 224 can be selected by the user to render a display of various contacts stored for the user of the client device 106. The Settings 227 can be selected by the user to render a display of various configuration settings, such as whether to show a custom screen on incoming calls, whether to show a custom screen on outgoing calls, whether to show a notes dialog screen when a call ends, and other configurations related to the client tracking application 124. The home user interface 203 for the client tracking application 124 may also include other components for generating invoices and managing text message communications.

Moving to FIG. 2B, shown is a view of an incoming call user interface 230. The incoming call user interface 230 can be displayed on the client device 106 when detecting an incoming call signal. Thus, the incoming call user interface 230 can replace the native incoming call user interface for the client device 106. In this embodiment, the incoming call user interface 230 displays a contact identifier 233, a billing amount 236, a client tracking icon 239, a decline call icon 242, and an accept call icon 245. The contact identifier 233 can represent a contact name, a phone number, or other suitable identifiers. The billing amount 236 can represent a real-time billed amount owed by the caller for the current phone call. In some embodiments, the billed amount can be calculated by multiplying a billing rate and a call duration. For example, a lawyer may have a billing rate of $100/hour and the current call duration may be 30 minutes. Thus, the billing amount 236 can display $50. In other embodiments, on the incoming call user interface 230, the billing amount 236 can represent an amount owed by the contact identifier 233 based on previous billing activity.

The client-tracking icon 239 can be a user interface component that when selected accepts the incoming phone call and initiates the tracking of the phone call metrics for the contact identifier 233. The decline call icon 242 can be a user interface component that when selected declines the incoming phone call. The accept call icon 245 can be a user interface component that when selected accepts the incoming call and does not track the phone call metrics. In other words, the accept-call icon 245 operates to accept the phone call in a normal mode.

Turning to FIG. 2C, shown is a view of a call tracking user interface 248. The call tracking user interface 248 can be rendered to display phone call metrics 127 and additional user interface components for initiating the recording of the phone call. From the call tracking user interface 248, the user can also generate a user interface for entering notes contemporaneously to the phone call. The call tracking user interface 248 can also include the contact identifier 233, a billing classification 251, the billing amount 236, a call duration indicator 254, a record call icon 257, an add note icon 260, and the decline call icon 242.

The contact identifier 233 can represent a contact name, phone number, or other suitable identifiers. The billing classification 251 can display an indicator for labeling the phone call. Some non-limiting examples of labels that may be displayed include billable call, non-billable call, a project name, or other suitable labels for the phone call. The billing amount 236 can indicate a real-time calculation of the billed amount owed for the present phone call. The call duration indicator 254 can display a real-time indicator of the present duration of the phone call.

The record call icon 257 can be selected during a phone call to initiate a recording of the phone call. The recorded audio file can be stored in association with the contact identifier 233 in memory. The client tracking application 124 can generate a transcript of the recorded audio file for storage in the client device 106 and/or the computing device 103. The add note icon 260 can be selected during a phone call to render another user interface for entering notes. After entering the notes, they can be stored in association with the contact or phone number of the phone call. The decline call icon 242 can be selected to terminate the phone call. In some scenarios, the call tracking user interface 248 can be rendered after the client-tracking icon 239 has been selected for an incoming call. In other scenarios, the call tracking user interface 248 can be rendered after initiating an outgoing call to a caller and the caller has accepted the call.

Figure 2D:
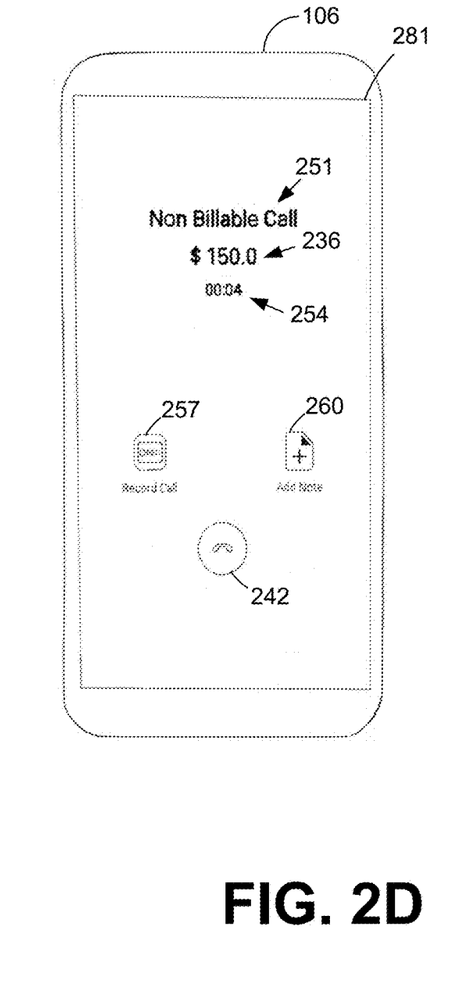

Moving to FIG. 2D, shown is a non-tracking user interface 281 that is rendered when the accept call icon 245 is selected for an incoming call. As illustrated, the billing classification 251 is set to display as "Non Billable Call." In this scenario, the user can see on the non-tracking user interface 248 that the current phone call is labeled as a non-billable call. As one skilled in the art can appreciate, other labels and classification systems can be used to classify calls. In addition, the billing amount 236 is set to display a billing rate instead of a real-time billing amount. The billing rate can represent a dollar amount per hour that would be charged if the phone call was labeled as a billable phone call.

In some embodiments, the non-tracking user interface 281 can include a client-tracking icon for converting the phone call to tracked phone call. In this example, the non-tracking user interface 281 can be converted to a call tracking user interface 248. In other words, a service professional may initially begin a phone call thinking that they do not want to track the metrics of the call. During the phone call, the service professional may desire to convert the present call into a call that this tracked.

Figure 2E:
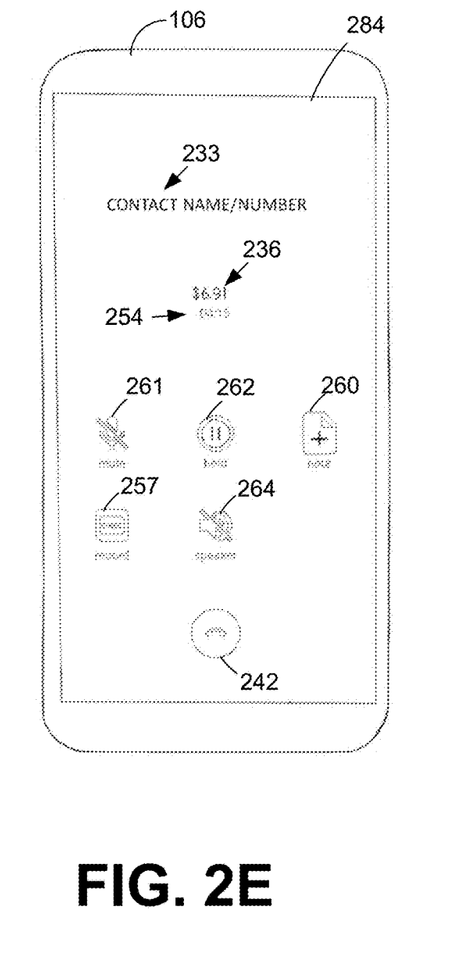

Moving to FIG. 2E, shown is an outgoing tracking user interface 284 that is rendered when a phone call is initiated from the keypad 215 associated with the client tracking application 124. In some embodiments, the outgoing user interface 284 can be rendered from the native phone application 143, which may be initiated from a native phone keypad or from a native phone contacts. Similar to the FIG. 2C, the outgoing tracking user interface 284 can function similar to the call tracking user interface 248. As illustrated in FIG. 2E, the outgoing tracking user interface 284 has similar user interface components, such as the contact identifier 233, the billing amount 236, the call duration indicator 254, the add note icon 260, and the record call icon 257. These user interface elements can operate similar to the corresponding elements discussed in FIG. 2C.

In addition, the outgoing tracking user interface 284 includes a mute icon 261, a hold call icon 262, and a speaker icon 264. The mute icon 261, when selected, can operate to disable capturing the audio input from the client device 106. The hold call icon 262 can operate to place a phone call on hold when selected. The speaker icon 264 can operate to output the phone call audio through a dedicated speaker configured for louder audio level.

Figure 2F:
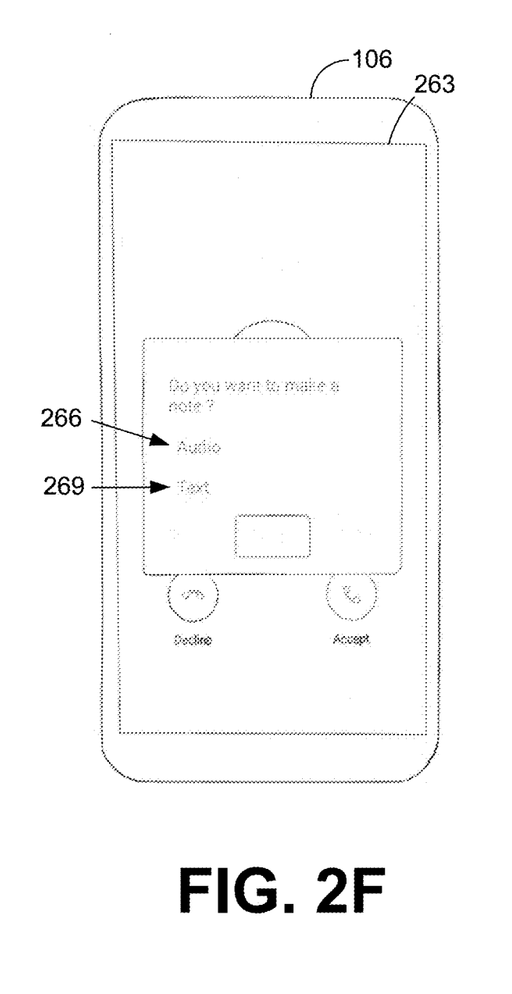

Referring next to FIG. 2F, shown is a notes user interface prompt 263 that can be used to select a method of annotating either during or after a phone call. The notes user interface prompt 263 can include an audio component 269 and a text component 269. The audio component 269 can be selected to initiate a voice memo recording on the client device 106. In some cases, the audio component 269 may be selected after a phone call to capture audio input of a voice memo regarding the phone call. In other words, the user may want to leave a voice memo on his or her thoughts on the recent phone call. The captured audio for the voice memo can be stored in association with the contact identifier 233. The text component 269 can be selected to render a user interface for entering notes either during or after the phone call. The notes can be stored in associated with the contact identifier 233.

Figure 2G:
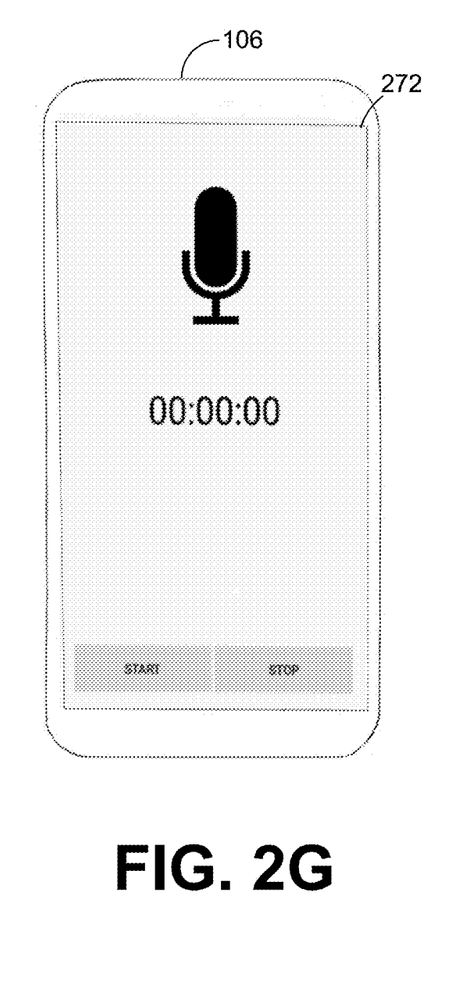

Moving to FIG. 2G, shown is an audio memo user interface 272 that can be used for capturing audio input from a microphone in the client device 106. In some cases, the audio memo user interface 272 may be used to capture a voice memo by a user of the client device 106 after a phone call. The audio memo user interface 272 can be rendered after a user selects the audio component 266 in the notes user interface prompt 263. In some embodiments, the audio memo user interface 272 can be rendered from selecting a user interface component from the home user interface 203.

Figure 2H:
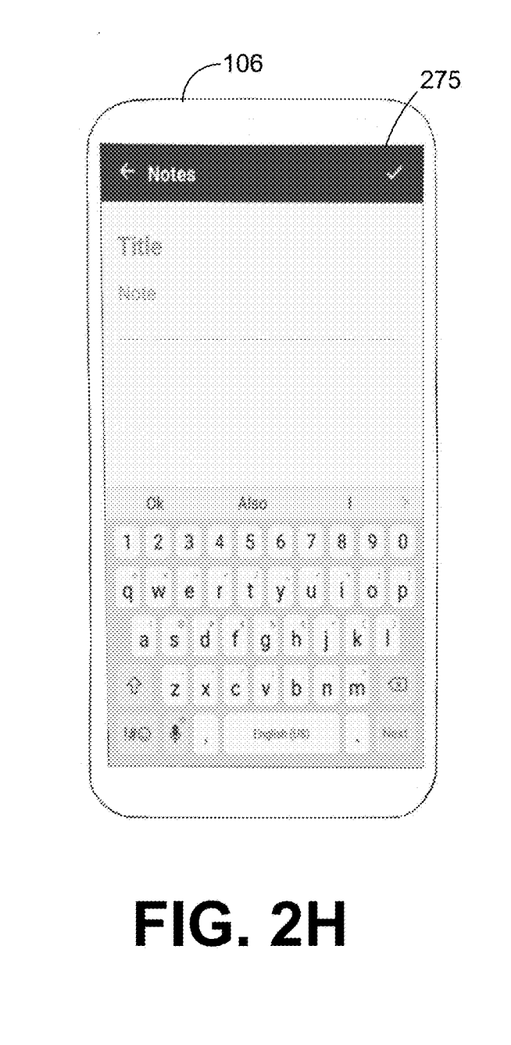
Figure 2I:
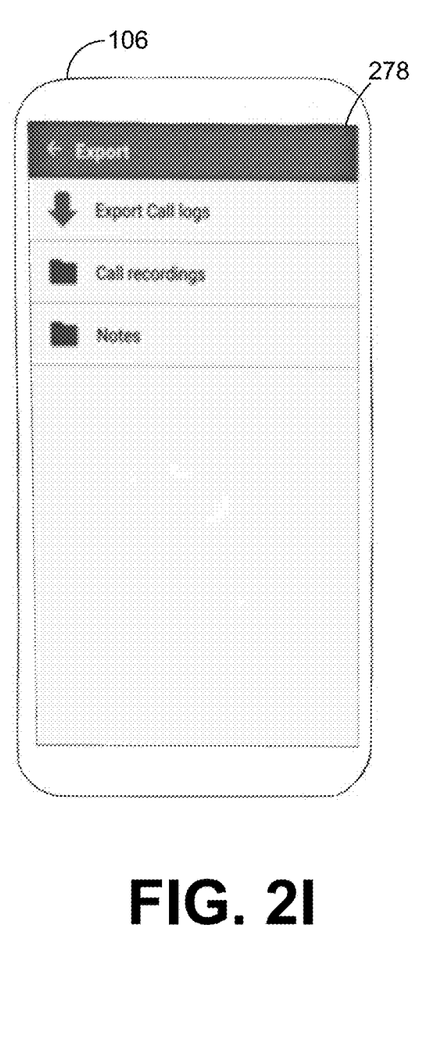

Moving to FIG. 2H, shown is a text memo user interface 275 that can be used to enter text during or after a phone call. The text memo user interface 272 can be rendered after a user selects the text component 269 in the notes user interface prompt 263. In some embodiments, the text memo user interface 275 can be rendered from selecting a user interface component from the home user interface 203. Next, FIG. 2I illustrates an export user interface 278 that can be used to export, access, or view call log data, phone call metrics, and notes entered from the text memo user interface 275. Additionally, the export user interface 278 can be used to export, access, or playback audio recording such as phone call recordings or voice memos. The export user interface 278 can be rendered from selecting a user interface component, e.g. an export icon 212, from the home user interface 203.

In some embodiments, the export user interface 278 can be used to transmit the call logs, call recordings, or notes to a third party application in a certain file format. For example, the call logs can be exported in a CSV file format to a third-party billing application. The exported CSV file can include the contact name, the call duration, and a billing rate. The third-party billing application can then use the CSV file to automatically generate a billing invoice for the contact name. For example, after the CSV file is exported to the third-party billing application, it can generate a hyperlink for a billing invoice. In another example, the call recordings or notes can be exported to a remote networked storage system. For example, the client tracking application 124 can transmit the call recordings to a cloud document management system for storage.

Figure 2J:
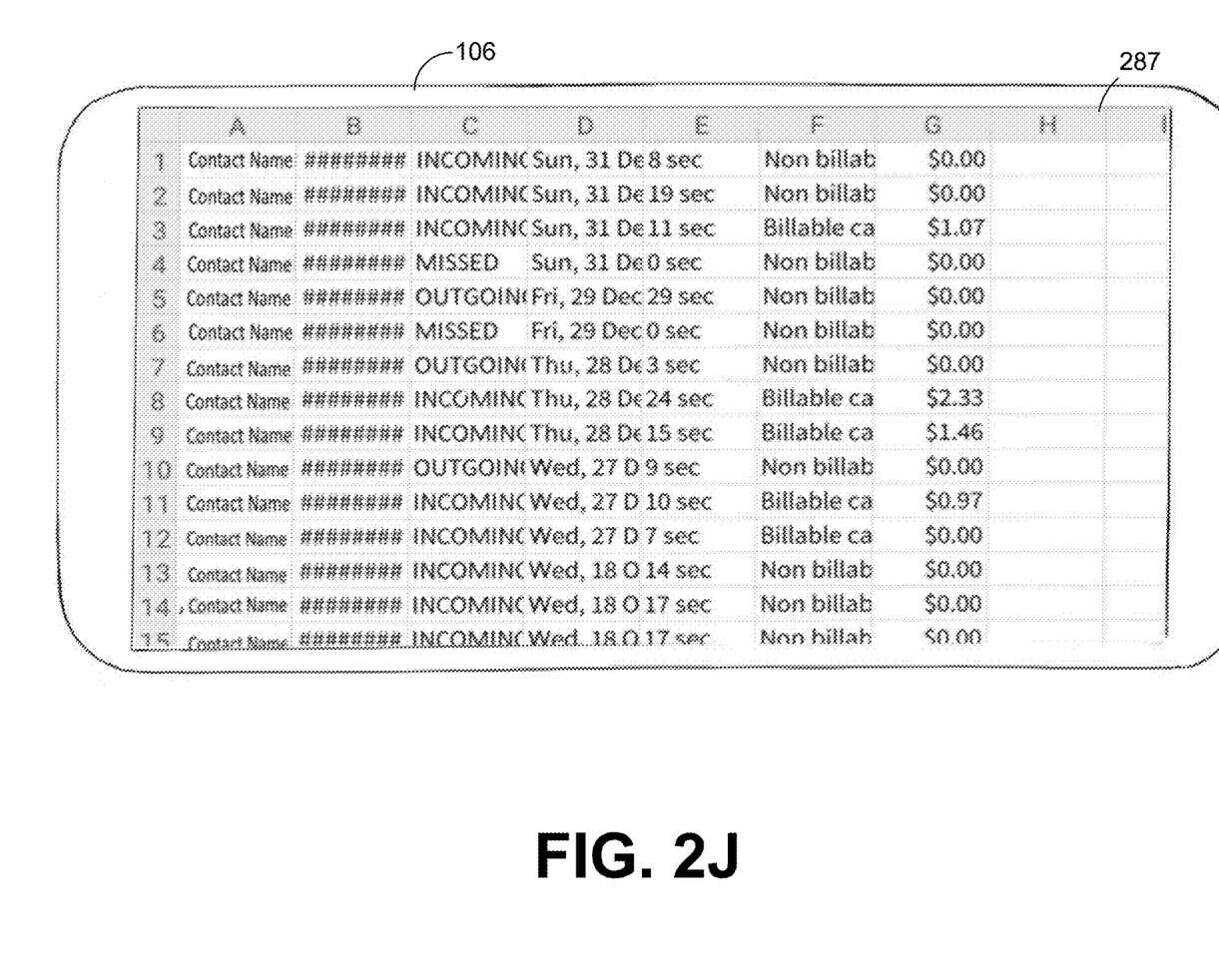

Next, FIG. 2J illustrates an example of a CSV file 287 downloaded by the client tracking application 124. The CSV file 287 includes the contact name, the phone number, an incoming/outgoing indication, a date of the phone call, a time of the phone call, the billing classification 251, the billing amount 236, and other suitable phone call metrics data. In some embodiments, the CSV file 287 can be downloaded by selecting the export icon 212 from the home user interface 203 or by a selection made on the export user interface 278.

Figure 3A:
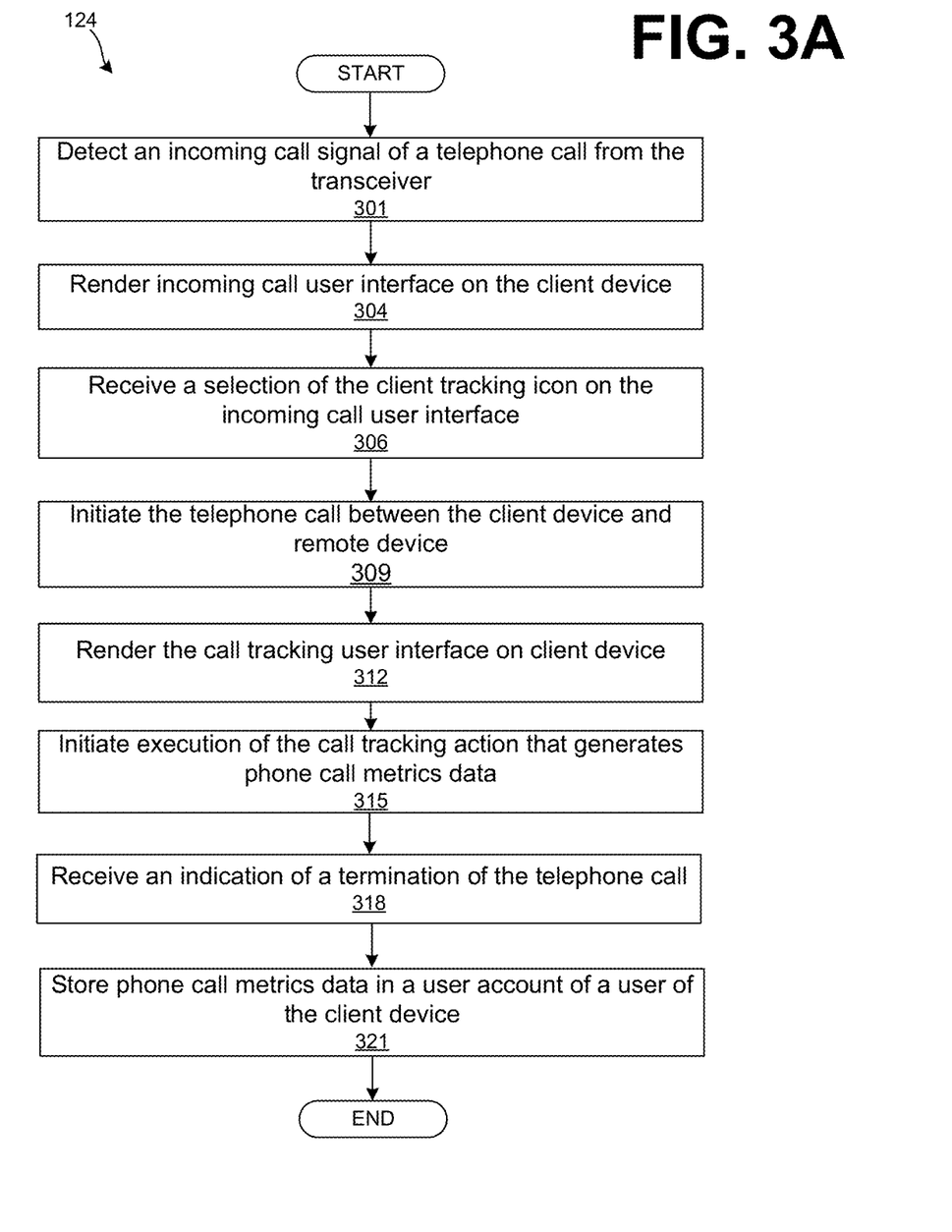
FIGS. 3A and 3B are flowcharts illustrating two examples of functionality implemented as portions of the client tracking application executed in the client device in the networked environment of FIG. 1 according to various embodiments of the present disclosure.
Figure 3B:
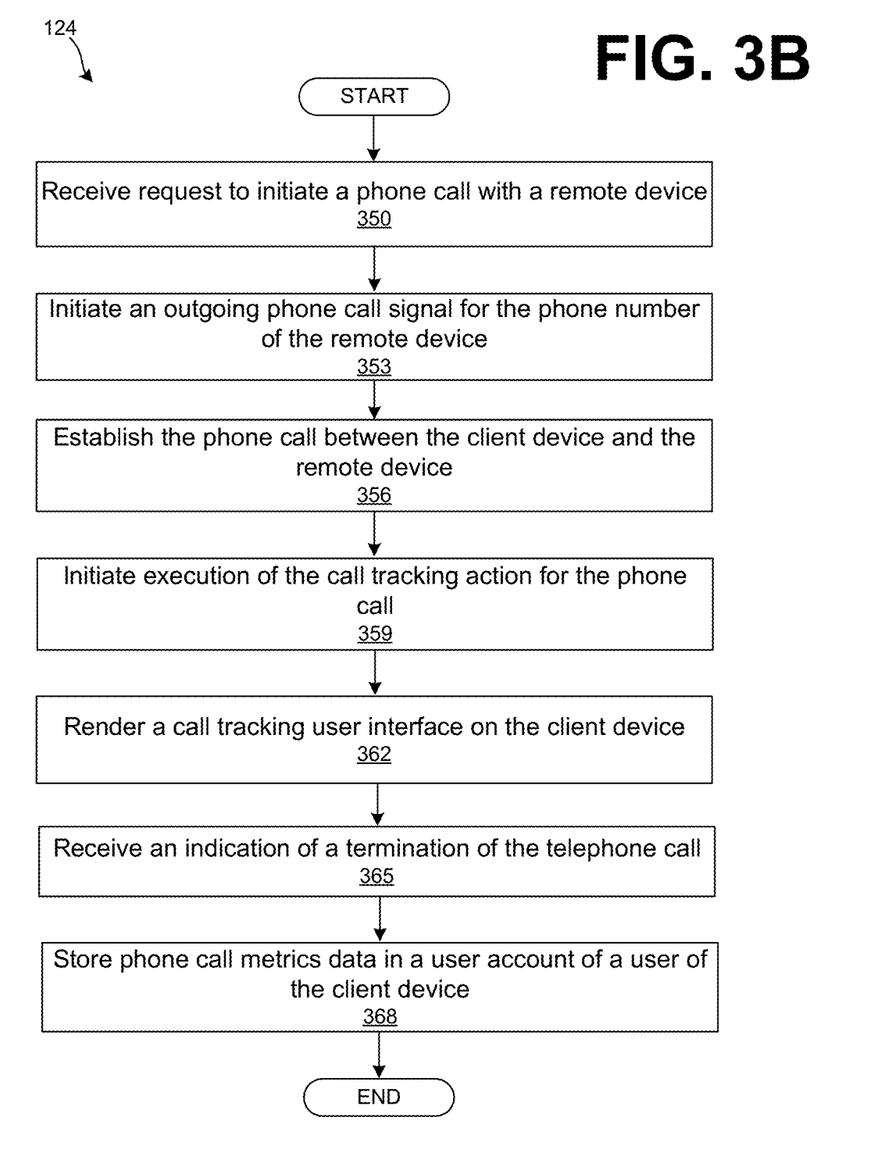

Referring next to FIGS. 3A and 3B, shown are flowcharts that provide examples of some of the operations of the client tracking application 124 according to various embodiments. It is understood that the flowcharts of FIGS. 3A and 3B provide two examples of the many different types of functional arrangements that may be employed to implement the operation of the client tracking application 124 as described herein. As an alternative, the flowcharts of FIGS. 3A and 3B may be viewed as depicting examples of elements of methods implemented in the computing device 103 (FIG. 1) according to one or more embodiments.

FIG. 3A illustrates an exemplary flowchart for the client tracking application 124 processing an incoming call. Beginning with box 301, the client tracking application 124 can detect an incoming call signal of a telephone call. The call can be detected by the transceiver 139 of the client device 106. In box 304, the client tracking application 124 can render the incoming call user interface 230 on the client device 106. Then, in box 306, the client tracking application 124 can receive a selection of the client tracking icon 239 on the incoming call user interface 230.

In box 309, the client tracking application 124 can initiate the telephone call between the client device 106 and remote device. Then, in box 312, the client tracking application 124 can render the call tracking user interface 248 on the client device 106.

In box 315, the client tracking application 124 can initiate the execution of the call tracking action that generates phone call metrics data on the phone call. Some non-limiting examples of call tracking actions include tracking call log information, tracking the call duration, tracking a billed amount owed based on the call duration, recording the phone call conversation between the client device and the remote device, receiving an input for a text note, and other suitable actions.

In box 318, the client tracking application 124 can receive an indication of a termination of the phone call. Specifically, the client tracking application 124 can receive a selection of the decline call icon 242 during the phone call or the client device 106 can receive an indication that the remote device has terminated the phone call.

In box 321, the client tracking application 124 can store the phone call metrics as communications metrics data 148 in the data store 145 of the client device 106. The communications metrics data 148 can be transmitted to the computing device 103 for storage in the data store 112, where it is saved as phone call metrics 127. Audio recordings captured before, during, or after the phone call can be stored in the client audio data 151. The client tracking application 124 can then proceed to the end.

Next, FIG. 3B illustrates an exemplary flowchart for the client tracking application 124 processing an outgoing phone call on the client device 106. Beginning with box 350, the client tracking application 124 can receive a request by the client device 106 to initiate a phone call with a remote device. The request can comprise a phone number of the remote device. The request can be generated from the native phone application 143, the keypad 215 in the client tracking application 124, the contacts 224 in the client tracking application 124, or other suitable methods for initiating a phone call in the client device 106.

In box 353, the client tracking application 124 can initiate an outgoing phone call signal for the phone number of the remote device. Initiating the phone call can involve instructing the transceiver 139 to initiate an outgoing phone call signal with the remote device.

In box 356, the client tracking application 124 can establish the phone call between the client device and the remote device. Particularly, the phone call can be established between the client device 106 and the remote device upon an acceptance of the phone call by the remote device.

In box 359, the client tracking application 124 can initiate execution of the call tracking action for the phone call. As previously discussed, some non-limit examples of call tracking actions include tracking call log information, tracking the call duration, tracking a billed amount owed based on the call duration, recording the phone call conversation between the client device and the remote device, receiving an input for a text note, and other suitable actions. In box 362, the client tracking application 124 can render a call tracking user interface on the client device.

In box 365, the client tracking application 124 can receive an indication of a termination of the phone call. Specifically, the client tracking application 124 can receive a selection of the decline call icon 242 during the phone call or the client device 106 can receive an indication that the remote device has terminated the phone call. In box 368, the client tracking application 124 can store the phone call metrics as communications metrics data 148 in the data store 145 of the client device 106. The client tracking application 124 can proceed to the end.

Figure 4:
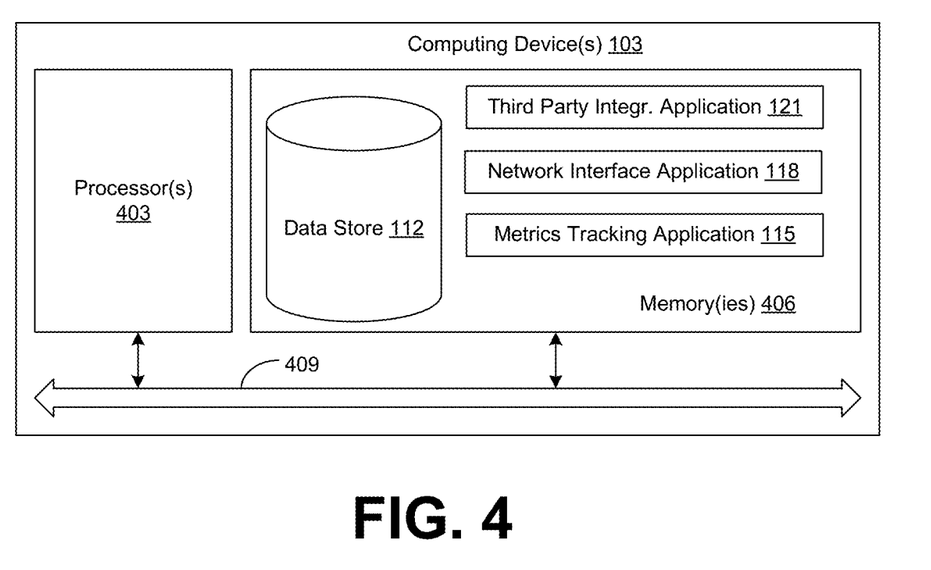
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes one or more computing devices 103. Each computing device 103 includes at least one processor circuit, for example, having a processor 403 and a memory 406, both of which are coupled to a local interface 409. To this end, each computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are list of main applications, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the third part integration application 121, the network interface application 118, the metric tracking application 115 and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including list of main applications, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM) or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including list of main applications, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 103, or in multiple computing devices in the same computing device 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A mobile device, comprising:
a transceiver;
a computing device electrically coupled to the transceiver; and
an application executable in the computing device, wherein, when executed, the application is configured to cause the computing device to at least:
  detect an incoming call signal of a phone call from the transceiver, wherein the incoming call signal is initiated by a remote device;
  render an incoming call user interface on a display of the mobile device, the incoming call user interface comprising a call tracking component, an accept call component, and a decline call component, the call tracking component being configured to initiate a call tracking action and assign a billing classification to the phone call;
  receive an indication of a user manipulation of the call tracking component on the incoming call user interface prior to initiating the phone call;
  initiate the phone call between the mobile device and the remote device;
  execute the call tracking action during the phone call, the call tracking action comprising generating call data associated with the phone call, wherein the call data is generated based at least in part on a duration of the phone call;
  render a call tracking user interface on the mobile device during the phone call, the call tracking user interface displays a billing classification and the call data;
  receive an indication of a user manipulation of a record call component on the call tracking user interface during the phone call;
  initiate an audio recording of the phone call with the remote device;
  receive an indication of a termination of the phone call; and
  store the call data in a memory associated with the mobile device.

2. The mobile device of claim 1, wherein the application is further configured to cause the computing device to at least render a notes user interface in response to receiving the indication of the termination of the phone call, the notes user interface comprising an audio memo component and a text memo component.

3. The mobile device of claim 2, wherein the application is further configured to cause the computing device to initiate an audio recording of an audio input received from the mobile device in response to receiving an indication of a user manipulation of the audio memo component.

4. The mobile device of claim 1, wherein the computing device is further configured to:
store the audio recording in the memory of the mobile device; and
initiate a playback of the audio recording in response to receiving a user manipulation of a playback user interface component.

5. The mobile device of claim 1, wherein the application is further configured to cause the computing device to:
store the call data in association with a plurality of call log entries, the plurality of call log entries corresponding with a plurality of calls executed on the mobile device;
receive an indication of a user manipulation of an export user interface component on the mobile device; and generate a common-separate values (CSV) file that includes the plurality of call log entries and a plurality of billing fees associated with individual ones of the plurality of call log entries.

6. The mobile device of claim 1, wherein the rendering of the call tracking user interface on the mobile device during the phone call further comprises:

receiving an indication of a user manipulation of a notes component on the call tracking user interface during the phone call;

rendering a notes user interface that is configured to receive a plurality of text characters as user input during the phone call; and storing the plurality of text characters in the memory in association with a phone number that initiated the phone call, the phone number being associated with the incoming call signal.

7. The mobile device of claim 1, wherein the application is further configured to cause the computing device to generate a common-separate values (CSV) file that includes the call data in response to receiving an indication of a user manipulation of an export user interface component.

8. The mobile device of claim 7, wherein the application is further configured to cause the computing device to render the call data in the CSV file on a user interface for the mobile device.

9. A non-transitory computer-readable medium comprising a program executable in a mobile device, that when executed, causes the mobile device to perform a method comprising:

receiving a request to initiate a phone call for a phone number of a remote device;

initiating, via a transceiver of the mobile device, an outgoing phone call signal for the phone number of the remote device;

upon receiving an indication of an acceptance of the outgoing phone call signal, establishing the phone call between the mobile device and the remote device;

tracking a time period for a duration of the phone call;

rendering a call tracking user interface on the mobile device during the phone call, the call tracking user interface includes a billing classification and call data, the call data comprising a billing fee that is calculated based at least in part on the time period of the phone call and a hourly rate, the call tracking user interface including an audio recording component that is configured to initiate an audio recording of the phone call upon a user manipulation of the audio recording component;

receiving an indication of a user manipulation of the audio recording component on the call tracking user interface during the phone call;

initiating the audio recording of the phone call with the remote device;

receive an indication of a termination of the phone call; and store the call data in a memory associated with the mobile device.

10. The non-transitory computer-readable medium of claim 9, wherein the method further comprises rendering a notes user interface in response to receiving an indication of a termination of the phone call, the notes user interface comprising an audio memo component and a text memo component.

11. The non-transitory computer-readable medium of claim 10, wherein the method further comprises:

initiating an audio recording of an audio input received from the mobile device in response to receiving an indication of a user manipulation of the audio memo component; and storing, in the memory on the mobile device, the audio recording in association with the phone number.

12. A method, comprising:

detecting, by a transceiver of a mobile device, an incoming call signal of a phone call, wherein the incoming call signal is initiated by a remote device;

rendering, by the mobile device, an incoming call user interface on the mobile device, the incoming call user interface comprising a call tracking component configured to initiate a call tracking action;

receiving, by the mobile device, an indication of a user manipulation of the call tracking component;

initiating, by the mobile device, the phone call between the mobile device and the remote device;

executing, by the mobile device, the call tracking action during the phone call, the call tracking action comprising generating call data associated with the phone call, wherein at least some of the call data is determined based at least in part on a duration of the phone call;

rendering, by the mobile device, a call tracking user interface on the mobile device during the phone call, the call tracking user interface displaying a billing classification and at least a portion of the call data, the call tracking user interface comprising an audio recording component that is configured to initiate an audio recording of the phone call;

receiving, by the mobile device, an indication of a termination of the phone call; and storing, by the mobile device, the call data in a memory associated with the mobile device.

13. The method of claim 12, wherein the incoming call user interface further comprises an accept call component that is configured to initiate the phone call without the execution of the call tracking action and a decline call component that is configured to decline the phone call.

14. The method of claim 12, further comprising:

rendering, by the mobile device, a notes user interface in response to receiving the indication of the termination of the phone call, the notes user interface comprising an audio memo component and a text memo component.

15. The method of claim 14, further comprising initiating an audio recording of audio input received by the mobile device in response to receiving an indication of a user manipulation of the audio memo component.

16. The method of claim 12, further comprising generating a transcript of the audio recording of the phone call between the mobile device and the remote device.

17. The method of claim 12, further comprising:

rendering, by the mobile device, a classification user interface configured to adjust the billing classification of the call data as either billable or non-billable.

18. The method of claim 12, further comprising:

generating a common-separate values (CSV) file that includes the call data in response to receiving an indication of a user manipulation of an export user interface component.

* * * * *